(No Model.)
C. M. FOWLER.
WINDOW FASTENER.
No. 572,052. Patented Nov. 24, 1896.
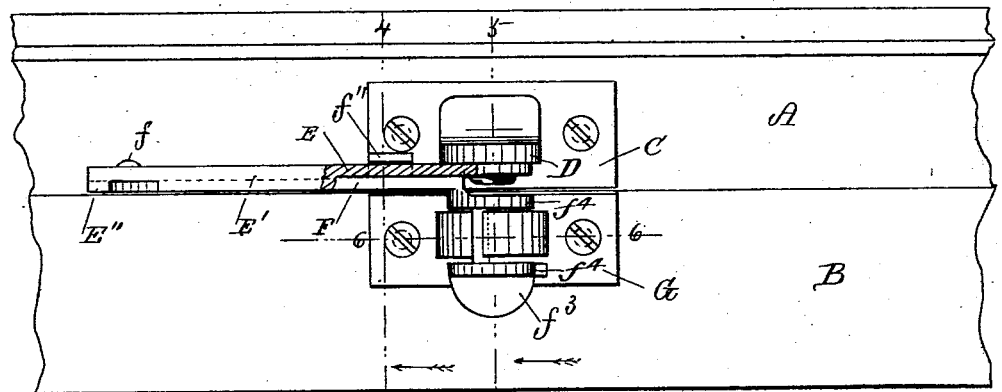
Fig. 1.
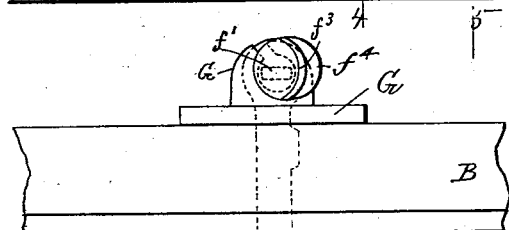
Fig. 2.
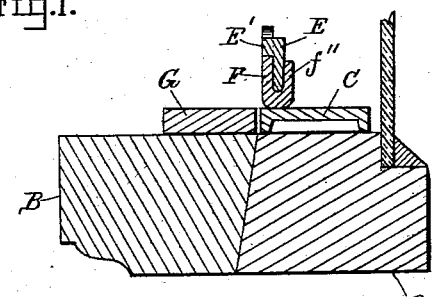
Fig. 4.
Fig. 6.
Fig. 3.
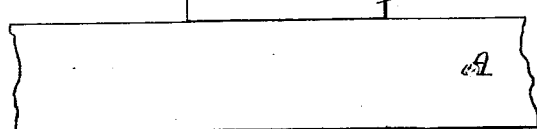
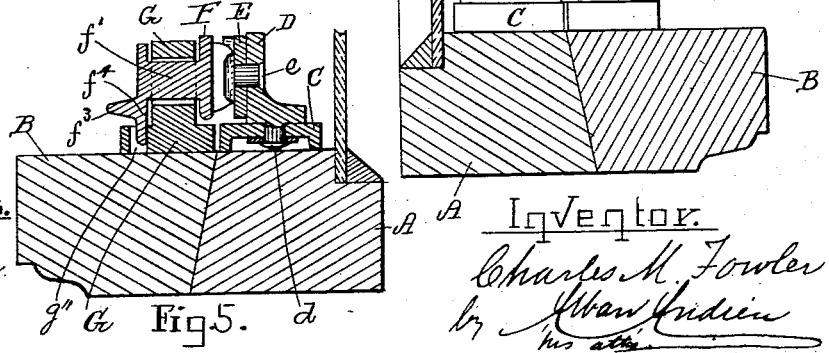
Fig. 5.
Witnesses.
Lauritz N. Möller
Charles A. Harris
Inventor.
Charles M. Fowler
by Albau Andrew
his atty

) # UNITED STATES PATENT OFFICE.

CHARLES M. FOWLER, OF WORCESTER, MASSACHUSETTS, ASSIGNOR TO NORMAN F. TUCKER, OF SAME PLACE, AND ALBYN A. STEBBINS, OF FITCHBURG, MASSACHUSETTS.

WINDOW-FASTENER.

SPECIFICATION forming part of Letters Patent No. 572,052, dated November 24, 1896.

Application filed June 4, 1896. Serial No. 594,220. (No model.)

*To all whom it may concern:*

Be it known that I, CHARLES M. FOWLER, a citizen of the United States, and a resident of Worcester, in the county of Worcester and State of Massachusetts, have invented new and useful Improvements in Window-Fasteners, of which the following, taken in connection with the accompanying drawings, is a specification.

This invention relates to improvements on the patent for window-fasteners granted to me August 21, 1894, No. 524,803, and it is carried out as follows, reference being had to the accompanying drawings, wherein—

Figure 1 represents a top plan view of the invention shown in locked position. Fig. 2 represents a front elevation of the invention, showing the links expanded for holding the window-sashes at a proper distance from each other for ventilating purposes. Fig. 3 represents a sectional view of the sashes and showing the fastener unlocked to permit the sashes to move freely by each other. Fig. 4 represents a cross-section on the line 4 4, shown in Fig. 1. Fig. 5 represents a cross-section on the line 5 5, shown in Fig. 1; and Fig. 6 represents a cross-section on the line 6 6, shown in Fig. 1.

Similar letters refer to similar parts wherever they occur on the different parts of the drawings.

In the drawings, A represents the meeting-rail of the outer sash, and B represents the meeting-rail of the inner sash, of windows, as usual.

On the top of the rail A is secured the metal plate C, to which is pivoted at $d$ the angular bracket D, and to the latter is pivoted at $e$ the link E, the outer end of which is pivoted at $f$ to the locking-link F, as shown.

In one piece with the inner end of link F is made a lateral flattened shank $f'$, adapted to be interlocked with the lock-plate G, secured to the top of the inner meeting-rail B, as shown in the drawings. The said lock-plate G has an inclined notch or opening $g$ connected to a circular transverse perforation $g'$, as shown in Fig. 6.

The link F is provided with a hooked lip $f''$, adapted to hook under the link E and thus holding the said links together when the device is in the locked position shown in Fig. 1, and thus preventing said links from being pulled apart from each other when the meeting-rails of the sashes are closed against each other and the device locked, as shown in said Fig. 1.

In practice I prefer to make a strengthening-rib $E'$ on the link or lever E, against which the link or lever F rests when the device is locked, as shown in Fig. 1, as well as when unlocked, as represented in Fig. 3. Said rib $E'$, as well as the hook $f''$, or either of them, also serve as means for holding the links or levers E F connected when the device is in the locked position shown in Fig. 1, thus preventing the sashes to be opened from within or without as long as the device is in such locked position.

On the end of the link or lever E is made a projection $E''$, which serves as a stop for the link or lever F when the device is used in the manner shown in Fig. 2.

The shank $f'$ on the end of the lever F terminates at its outer end as a flange-cam or cam-disk $f^4$, which is adapted to enter a groove or recess $g''$ in the plate G, as shown in Fig. 5, for the purpose of laterally moving the rails A B toward each other and holding them in close contact with each other when the device is locked, and thus exclude dust, rain, and snow, as represented in Figs. 1, 4, and 5.

In practice I prefer to provide the inner end of the lever F with a latch or thumb-piece $f^3$, as shown, for the purpose of manipulating the device during the locking or unlocking operation.

If the device is in the locked position shown in Fig. 1 and it is desired to release it, it is only necessary to swing the levers or links E F in Fig. 1 toward the right, when the sashes may be moved vertically away from each other to permit ventilation, as shown in Fig. 2, in which position the links or levers E F are held in a vertical, or nearly so, position and the upper end of the lever F held interlocked with the plate G, so as to prevent the sashes from being opened farther while the device is in such position, as shown in said Fig. 2.

If the device is in the locked position shown in Fig. 1 and it is desired to entirely release the sashes from each other, the links or levers E F in Fig. 1 are swung toward the right sufficiently to cause the flattened shank $f$ to be moved out of the notch $g$ on the plate G, after which the now-released links or levers E F may be turned a fourth of a revolution on the pivot $d$ and placed in the position shown in Fig. 3, thus allowing the sashes to be moved by each other as far as may be desired.

Having thus fully described the nature, construction, and operation of my invention, I wish to secure by Letters Patent and claim—

The herein-described window-fastener consisting of a link or lever E universally jointed to one of the sashes, combined with a link or lever F, pivoted to the lever E and having a flattened shank $f'$ adapted to interlock with a notched lock-plate G secured to the other sash and having a groove or recess $g''$ and a cam-disk $f^4$ on the inner end of the lever F adapted to enter said groove and laterally press the sashes together when the device is locked substantially as and for the purpose set forth.

In testimony whereof I have signed my name to this specification, in the presence of two subscribing witnesses, on this 22d day of May, A. D. 1896.

CHARLES M. FOWLER.

Witnesses:
ALBAN ANDRÉN,
KARL A. ANDRÉN.